July 12, 1960   C. W. SMITH, JR., ET AL   2,944,575
DEVICE FOR OPENING EGGS
Filed May 13, 1958
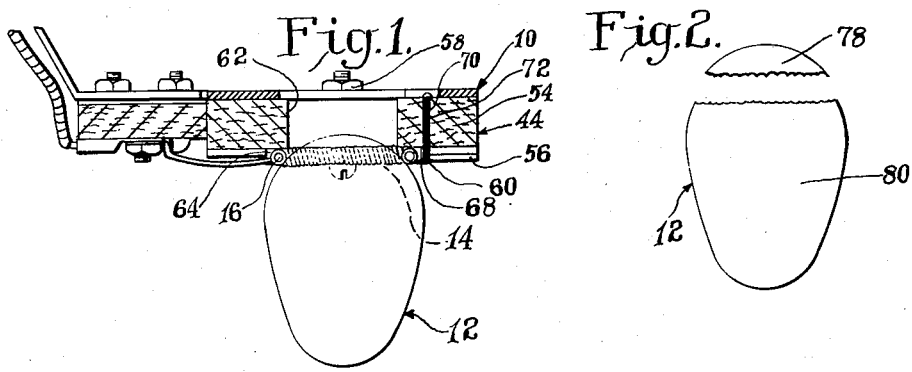
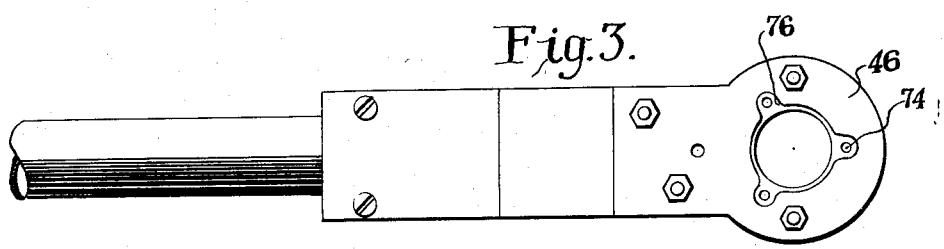
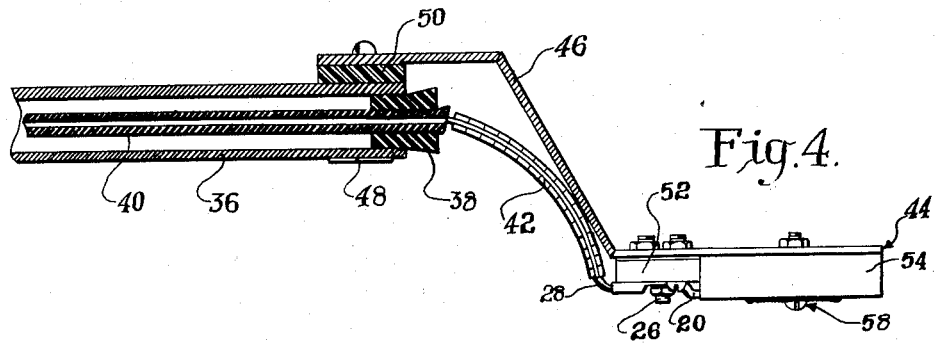
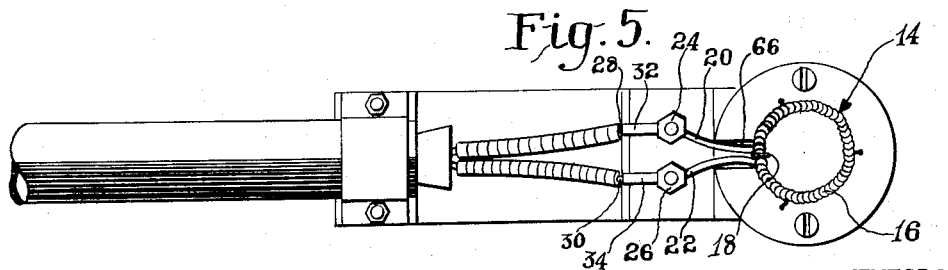
INVENTORS
Charles W. Smith, Jr.,
Francis X. Mead &
Elvan H. Dunbar, Jr.
BY *Connolly and Hutz*
ATTORNEYS

“2,944,575

DEVICE FOR OPENING EGGS

Charles W. Smith, Jr., Francis X. Mead, and Elvan H. Dunbar, Jr., Terre Haute, Ind., assignors to Chas. Pfizer & Co., Inc., New York, N.Y., a corporation of Delaware Filed May 13, 1958, Ser. No. 734,936

5 Claims. (Cl. 146—2)

This invention relates to a novel method and device for opening raw eggs, and more particularly relates to such a method and device which operate without introducing foreign matter into the egg.

Certain manufacturing and processing industries, for example, the pharmaceutical and baking industries utilize large quantities of eggs. In most instances, these eggs must be opened and the contents removed from the shell in a raw state. There are quite a large number of existing egg-opening methods and devices which, for example, break or saw through the shell by mechanical means. However, when sawing, cutting or abrading operations are performed, there is a very great likelihood of introducing considerable dust or other foreign particles into the interior of the egg. Even when elaborate vacuum systems are employed for abstracting dust and foreign particles from the vicinity of the egg, there is no assurance that 100% of these particles will be removed and prevented from entering into the egg. This problem is particularly acute in the pharmaceutical industry when large quantities of raw eggs are used as culture media, for example, in the manufacture of vaccines.

An object of this invention is to provide a simple, economical and convenient method and device for opening eggs without introducing foreign particles or dust into the interior of the egg.

In accordance with this invention, the surface of the egg is contacted by a substantially closed ring maintained at a temperature high enough to burn through the shell. This ring is provided, for example, by a ring-shaped electrical heating element mounted upon a rod.

Novel features and advantages of the present invention will become apparent to one skilled in the art from a reading of the following description in conjunction with the accompanying drawings wherein similar reference characters refer to similar parts and in which:

Fig. 1 is a cross-sectional view in elevation of one embodiment of this invention;

Fig. 2 is a view in elevation of an egg after being opened by the embodiment shown in Fig. 1;

Fig. 3 is a top plan view of the embodiment shown in Fig. 1;

Fig. 4 is a side view in elevation of the embodiment shown in Fig. 1; and

Fig. 5 is a bottom plan view of the embodiment shown in Fig. 1.

In Fig. 1 is shown a device 10 for opening an egg 12 including a ring-shaped electrical heating element 14, for example, made of Nichrome wire spirally wound about an insulating ring-shaped core 16, for example, formed of an asbestos cord. Nichrome is a trademark of the Driver-Harris Company for its brand of heat resistant alloys consisting of approximately 15–16% chromium, 59–62% nickel, about 24% iron, and 0.1% carbon. Its specific gravity is approximately 8.25, and its melting point is approximately 1350° C.

As shown in Fig. 5, ring-shaped element 14 is formed in a substantially closed ring whose adjacent portions are insulated from each other, for example, by an insulating washer 18 fitted upon asbestos cord 16. Ends 20 and 22 of winding 14 are brought out to terminals 24 and 26 where they are connected to electrical conductors or leads 28 and 30 as shown in Fig. 4. Leads 28 and 30 are channelled to terminals 24 and 26 through insulating ferrules 32 and 34, for example, made of ceramic tubing.

Conductors 28 and 30 are channelled through rod 36, for example, a hollow tubular rod, for example, made of aluminum tubing through a hollow rubber plug 38 fitted in the end of tube 36. The parts of conductors 28 and 30 disposed within aluminum tube 36 are covered with an insulating material 40, for example, rubber insulation. The portion of conductors 28 and 30 between plug 38 and terminals 24 and 26 is covered by an insulating medium 42, for example, short lengths of ceramic tubing.

Ring-shaped heating element 14 is supported from a toroidal assembly 44 which is mounted upon the end of rod 36 by a bracket 46 which, for example, is attached to the end of rod 36 by a U-shaped clamp 48. An insulating pad 50 is inserted between bracket 46 and rod 36 to prevent the rod from overheating. Pad 50 is, for example, made of Transite, which is the trademark of a brand of hard-pressed heavy board made from asbestos and Portland cement by the Johns-Manville Corporation. A similar Transite pad 52 is inserted between terminals 24 and 26 and the outer end of bracket 46.

A ring-shaped disc of asbestos 54 is secured against the lower edge of the outer portion of bracket 46 by washers 56, for example, made of steel by means of screw and nut assemblies 58. The holes 60 in the center of washers 56 are larger than the diameter of the hole 62 through asbestos ring 54 to provide a recess 64 within which ring-shaped heating element 14 is nested. A groove 66 (Fig. 5) is provided through washers 56 for passage of ends 20 and 22 to terminals 24 and 26. Heating element 14 is maintained nested within recess 64 by horizontally bent ends 68 of pins 70 which are inserted through vertical holes 72 in asbestos ring-shaped disc 54 and washers 56. The upper surface of bracket 46 adjacent heads 74 of pins 70 is recessed as shown at 76 to permit pins 70 to be insulated from the metal or heat conducting portions of bracket 46.

*Operation*

Device 10 is placed over an egg 12 as shown in Fig. 1. Hole 62 in toroidal assembly 44 permits the rounded top of egg 12 to project within heating element 14 and allows the exposed lower surface of heating element 14 to be brought into contact with the shell of egg 12. Sufficient current is applied through leads 28 and 30, and ring-shaped element 14 to burn through the surface or shell of the egg substantially immediately upon application of heating element 14 thereto to open it without permitting any foreign matter or particles to enter within the raw body of the egg. This practically immediately severs the shell of egg 12 into two separate portions 78 and 80. The upper part 78 may be easily removed from the egg either simultaneously with removal of device 10 or immediately thereafter. A convenient means of removal such as a vacuum lifting device may be incorporated with device 10 or applied to the top part 78 of the egg sometime after removal of device 10 from the egg.

What is claimed is:

1. A device for opening eggs comprising a rod, an electrical heating element formed in a substantially closed ring which is slightly smaller than the girth of an average egg, said ring being mounted upon said rod in a position in which an entire side of said ring is free to contact the shell of an egg, and electrical conductors connected to said heating element for connecting said heating element to a source of electrical power for maintaining the temperature of said ring high enough to immediately burn through the shell of an egg upon contact therewith.

2. A device as set forth in claim 1 wherein said rod is comprised of a hollow tube, said heating element is suspended from a bracket connected to the end of said tube, and said electrical conductors being channelled through said rod to the underside of said bracket.

3. A device as set forth in claim 2 wherein a ring-shaped assembly is suspended from said bracket, said assembly being cut out to include an annular recess in its lower surface, and said ring-shaped heating element being nested within said annular recess.

4. A device as set forth in claim 1 wherein said heating element is comprised of a coil of heat-resistant wire which is spirally wound around a ring of insulating material.

5. A device as set forth in claim 4 wherein said heating element is supported by L-shaped pins inserted through said ring-shaped assembly, said pins including horizontal legs, and said horizontal legs being disposed under said ring of insulating material in a position where no portion of said legs extends below the lower surface of said ring-shaped heating element.

References Cited in the file of this patent

UNITED STATES PATENTS

| | | |
|---|---|---|
| 821,361 | Hitner | May 22, 1906 |
| 1,600,675 | Kaye | Sept. 21, 1926 |
| 2,655,960 | Murray | Oct. 20, 1953 |
| 2,798,521 | Bourque | July 9, 1957 |